April 19, 1938.  J. PILNICK  2,114,936
THREAD GAUGE ADAPTER FOR MICROMETERS
Filed July 9, 1934
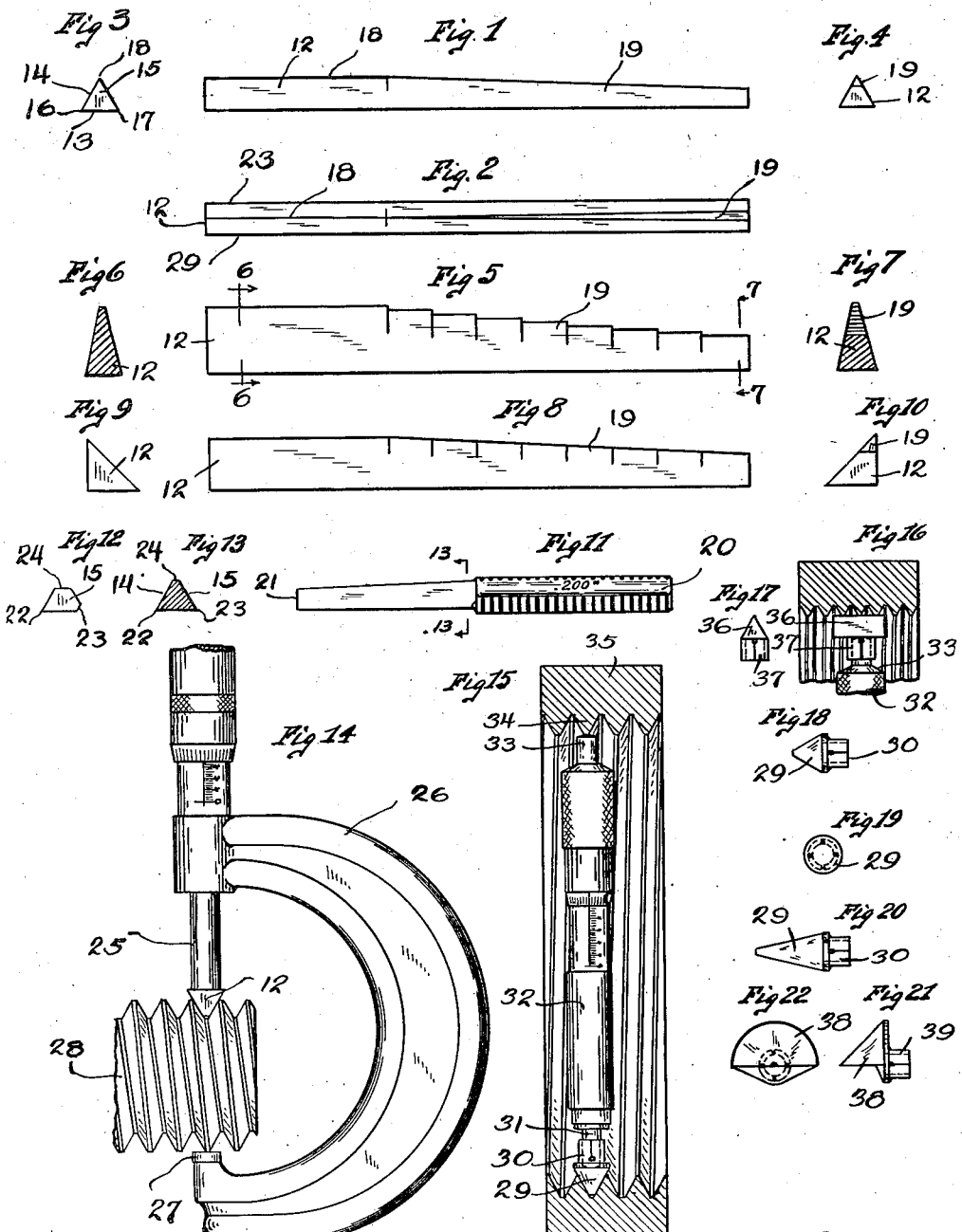

Patented Apr. 19, 1938

2,114,936

UNITED STATES PATENT OFFICE 2,114,936

THREAD GAUGE ADAPTER FOR MICROMETERS

Jacob Pilnick, Cleveland, Ohio

Application July 9, 1934, Serial No. 734,397

4 Claims. (Cl. 33—164)

The present invention relates to an improved adapter for micrometer gauges permitting the use of the latter for measuring screw-threads. The ordinary micrometer caliper does not lend itself to the accurate measurement of screw-threads since the engagement of the anvil and plunger of the caliper to the work cannot ordinarily be maintained in positive or normal position on account of the fact that the irregular surface of the work is not adapted for engagement by the ordinary faces of the caliper. Since the contacting members of the caliper are generally plane faces they do not always take the same position with respect to the work. If the outer edge of the thread rests upon the anvil of the caliper the latter may pivot around that point of contact and thus prevent the movable plunger from resting in a normal position on the diametrically opposite portion of the thread. Furthermore, the depth to which the thread has been cut cannot be determined by the use of the normal contacting members of the caliper.

It is an object of my invention to provide an adapter by which the size of the threads which have been cut can be readily calculated from the measurement found on the conventional micrometer.

It is a further object of my invention to provide an adapter which will engage the sides of the screw-threads being cut and from that engagement indicate the depth of the thread cut.

A still further object of my invention is to permit the depth of the thread to be indicated without requiring contact to be made at the bottom of the groove between the threads.

Among the objects of my invention is to provide an adapter which may be adjusted along the thread to provide the desired clearance over the bottom of the thread and still maintain a fixed position for the face that is to be engaged by the plunger of the micrometer.

It is also an object of my invention to provide an adapter of minimum length and a progressive adjustment equivalent to twice the normal length of the device.

The above and other features of my invention will be readily understood from the following description as illustrated on the accompanying drawing in which Fig. 1 is a side view of the adapter in simplest form;

Fig. 2 is a top plan view thereof;

Fig. 3 is a left end view of Fig. 1;

Fig. 4 is a right end view of Fig. 1;

Fig. 5 is a side view of a modified form of the adapter;

Fig. 6 is a cross-section on the line 6—6 of Fig. 5 and in the direction of the arrows;

Fig. 7 is a cross-section on the line 7—7 of Fig. 5 and in the direction of the arrows;

Fig. 8 is an end view of the adapter as used in the measurement of an external buttress screw-thread by means of a micrometer;

Fig. 9 is a left end view of Fig. 8;

Fig. 10 is a right end view of Fig. 8;

Fig. 11 is a side view of a modified form of this adapter providing a maximum of range over a small linear distance;

Fig. 12 is a left end view of this form;

Fig. 13 is a cross-section on the line 13—13 of Fig. 11;

Fig. 14 is a side view of a screw thread measured by means of a caliper and the adapter;

Fig. 15 is a side elevation of an internal caliper equipped with an adapter according to this invention and applied to an internal thread;

Fig. 16 shows a similar view with a modified form of adapter;

Fig. 17 is an end view of the last named adapter;

Fig. 18 is a side view of the adapter shown in Fig. 15;

Fig. 19 is an end view thereof;

Fig. 20 is an end view thereof showing a 29° angle;

Fig. 21 is a side view of such an adapter designed for internal buttress threads and Fig. 22 is an end view of the same.

The adapter consists essentially in a bar 12 of steel or similar hard material suitable to withstand wear under abrasion without material change in its form or dimensions. This bar as shown in Fig. 3 has a cross-section substantially that of an equilateral triangle. The base 13 is a plane surface. Two faces 14 and 15 are inclined with respect to the base 13 at angles of 60°. The edge formed by the intersection of the base 13 with the face 14 has been marked 16 for purposes of reference. The corresponding edge 17 is formed by the intersection of inclined face 15 with the base 13.

The edge 18 at the apex of the bar is similarly formed by the intersection of the side faces 14 and 15.

As will be more clearly shown in Fig. 1 the edge 18 extends about one-third the length of the bar 12. From this point to the opposite end of the bar the edge 18 is progressively flattened. In the instance illustrated where it is intended that the bar form an adapter having a constant value of .200 inch this flattening varies progressively from zero to one-sixteenth inch. This flattening of the edge 18 results in the formation of a top face 19 progressively widening toward the right end of the bar 12 and having a slight inclination with respect to the plane of the base 13.

By reference to Fig. 14 the utility and advantage of this adapter will be immediately apparent. The top face 19 is inserted within the thread between the adjacent sides of the latter bringing the side faces 14 and 15 in contact with the sides of the screw-thread. The gauge may be moved longitudinally until its side faces make contact but there is the desired separation between the top face 19 and the groove of the thread. In any position where the side faces 14 and 15 rest against the sides of the thread the adapter will provide allowance of a constant factor of .200 inch to be used with required depth of thread in calculating the corresponding final micrometer reading.

Fig. 5 illustrates the adapter in which the graduations in size are represented by a series of steps rather than a continuous slope. The angular relation of the opposite side faces of the adapter of Fig. 5 is shown in Fig. 6 while Fig. 7 indicates the appearance of the successive steps.

In Fig. 8 one side wall is perpendicular to the base as shown by Figs. 9 and 10 while the various successive graduations of the slope are marked on Fig. 8 to agree with the stepped sequence of Fig. 5.

In Fig. 11 the adapter has been shown in a compact form. At one end there is provided a hand grip 20 while the opposite end 21 provides the desired special arrangements.

Referring to Fig. 13 it will be seen that the cross-section near the juncture between the hand grip and the adapter is generally triangular except that the apex has been modified by a slight flat top 24 similar to that shown at 19 in Fig. 2. One edge 22 which is oppositely disposed to the side 15 is analogous to the edge 18 opposite the base 13 in the first described modification. This edge 22 is, therefore, adapted to reach into the groove of a screw-thread in the same manner in which the edge 18 would be used.

The edge 23 which is opposite the inclined face 14 is flattened progressively toward the free end of the adapter starting from zero as shown in Fig. 13 to an adjustment in Fig. 12 of substantially half the maximum desired graduation or extent of variation in depth of the inclination.

The remaining edge 24 as shown in Fig. 13 has a flattened dimension substantially equal to the maximum of the edge 23. However, this increases toward the free end as shown in Fig. 12 to the maximum graduation desired. It will, therefore, be evident that the three edges of the adapter 21 provide all graduations found in the much longer bar 12.

As has already been said either face of the device may be used as an anvil upon which the plunger 25 of the micrometer 26 rests. The opposite anvil 27 is in contact with the outer diameter of the screw-thread 28. The adapter 12 may then be moved along the thread until the faces 14 and 15 are properly seated against the side of the thread. By this seating it is meant that the side faces 14 and 15 will rest on opposite sides of the thread in lines of contact which are transverse to the adapter faces and which intersect the longitudinal axis of the screw. These lines of contact preclude the accidental engagement of the adapter solely on a single high point on the surface of the side of the screw thread. The reading of the micrometer gauge will then indicate the depth to which the thread has been cut.

The required depth of cut will be found by the use of suitable formulas involving only a knowledge of the constant value of the adapter 12 and the graduated or standardized depth of cut. Thus the desired micrometer reading equals the outside diameter of the screw required plus the difference between the constant of the adapter and the standard depth of a single thread of the screw. Expressed in another way and using data readily available in machinists' tables, the root of the thread plus the single depth of thread plus the constant value of the adapter bar equals the desired reading of the micrometer for the appropriate thread standard. This also permits allowance for the slight undersize variation from standard which is used in cutting commercial threads. Illustrating this procedure by example, the following calculations are made from the appropriate tables:

⅞"—9 U. S. Standard

| | Inch |
|---|---|
| Root of thread | .7307 |
| Single depth of thread | .0721 |
| Adapter thickness | .195 |
| Thread gauge should read | .9978 |

⅜"—16 U. S. Standard

| | Inch |
|---|---|
| Root of thread | .2936 |
| Single depth of thread | .0405 |
| Adapter thickness | .195 |
| Thread gauge should read | .5291 |

It will be obvious that where the required depth of the screw-thread is greater than the constant allowance of the adapter 12, the calculation will be accordingly modified as the above indicated difference is a negative quantity and thus reduces the micrometer reading required.

In Figs. 15 to 22 inclusive, I have shown the use of my invention for the measurement of the depth of internal threads. In this instance the adapter takes the form of a conical plug 29 having a spring sleeve 30 which is adapted to fit over the plunger 31 of an internal micrometer 32. The anvil 33 of the caliper rests upon the edge of the screw-thread 34 in the member 35. The conical adapter 29 has tapering lines of contact with the sides of the thread and the fixed allowance of the adapter will then permit the measurement of the depth of the screw-thread. Here again, the measurement of the screw-thread is obtained on a measurement based upon contact with the sides of the screw-thread rather than the depth of the groove.

In some instances it is desirable to supply a further abutment for the anvil 33 and one form has been shown in Figs. 16 and 17. Here the abutment takes the form of a prism 36 having a spring socket 37 for mounting on the anvil 33. In this way the micrometer 32 is maintained in a position perpendicular to the axis of the screw-threads.

In Figs. 18 and 19 the adapter 29 is similar to that shown in Fig. 15 except that the angularity of the cone has been changed from 60° to 55°.

In some instances where a different angularity is called for, for example to handle screw-threads of 29° the form such as Fig. 20, is provided.

A further form for a 45° buttress screw-thread is shown in Figs. 21 and 22 where the semi-conical adapter 38 is mounted upon a spring backing 39.

The use of these forms of the adapter is self-evident. While this invention has been illustrated and described in its preferred forms, still this is without limitation upon the invention other than as indicated by the scope of the following claims.

What I claim is:

1. An adapter bar for a gauge having a base and two faces all inclined each to the others, two edges being flattened to provide jointly a single progressive series of varying distances measured from the opposite face or base.

2. An adapter bar for a gauge having a base and two faces all inclined each to the other, two edges between intersecting faces being flattened to provide jointly a single progressive series of stepped distances measured from the opposite face or base.

3. An adapter bar for a gauge having a hand grip at one end and three faces each inclined at 60° to the others, the edge between one pair of faces being cut away on a plane converging toward the end of the gauge and the edge between another pair of faces being cut away on a similar plane converging toward the said end, the amount of convergence of the second plane exceeding that of the first plane whereby the perpendicular distances measured from the second plane to the opposite face are progressive continuations of the variations provided by the perpendicular distances measured from the first plane to the face opposite thereto.

4. An adapter bar for a gauge having a hand grip or handle and a work member extending from one end of the handle, said work member having three faces all inclined each to the others, two edges between intersecting faces being flattened to provide jointly a single progressive series of variable distances measured from the opposite face.

JACOB PILNICK.